April 28, 1942.  W. H. RYAN  2,281,112
VARIABLE DENSITY WINDOW
Filed Nov. 6, 1940
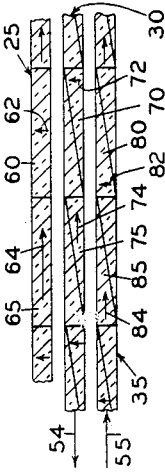
FIG. 3
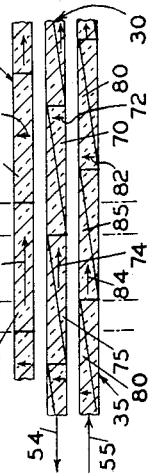
FIG. 4
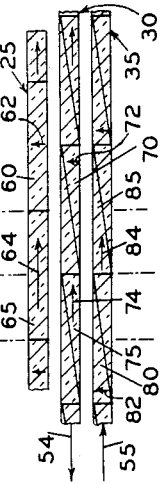
FIG. 5
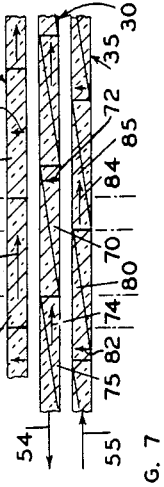
FIG. 6
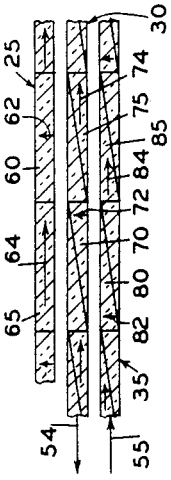
FIG. 7
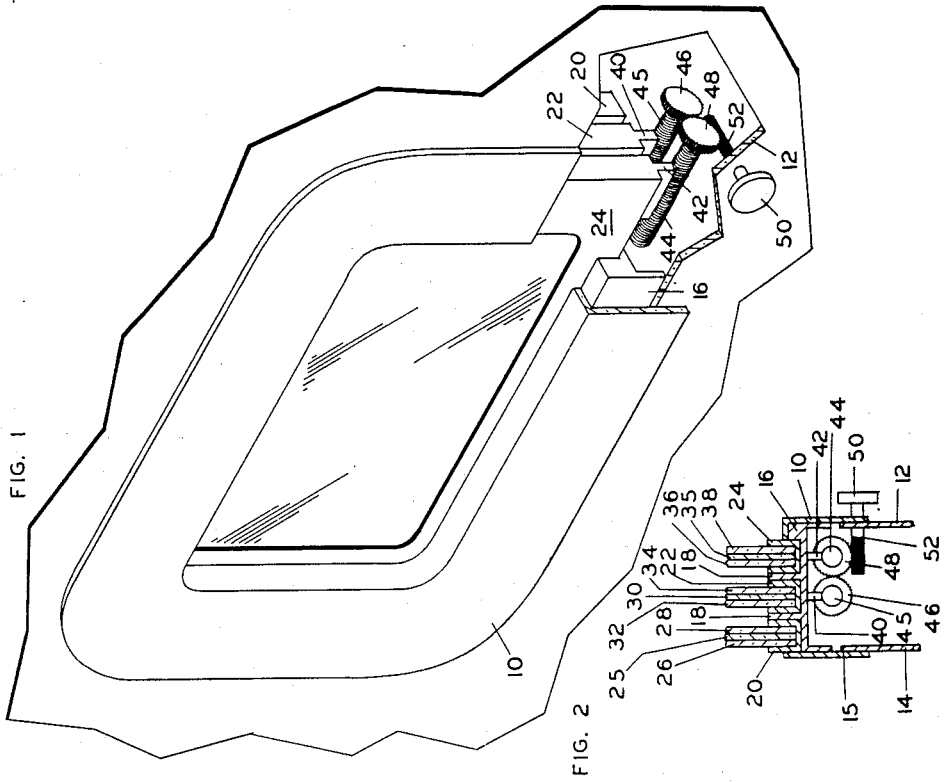
INVENTOR.
William H. Ryan
BY Donald C. Brown
Attorney Patented Apr. 28, 1942

2,281,112

UNITED STATES PATENT OFFICE 2,281,112

VARIABLE DENSITY WINDOW

William H. Ryan, Cambridge, Mass., assignor to Polaroid Corporation, Dover, Del., a corporation of Delaware Application November 6, 1940, Serial No. 364,522

7 Claims. (Cl. 88—65)

This invention relates to variable density windows and to light-polarizing devices for use therein.

It is one object of the invention to provide a novel form of variable density window or viewing device wherein it is possible to vary the intensity of the light transmitted from a predetermined minimum to a predetermined maximum.

Another object is to provide such a variable density window comprising three parallel light-polarizing elements, two of which are movable linearly with respect to the third, to vary the amount of the light transmitted.

A further object is to provide novel light-polarizing devices of varying polarizing properties for use in the variable density window of the invention.

Other objects and advantages will in part appear and in part be pointed out in the course of the following description of an embodiment of the invention which is given as a non-limiting example in connection with the accompanying drawing, in which:

Figure 1 is a perspective view showing a variable density window embodying a form of the invention, the view being partly broken away to show means for controlling the movable elements;

Fig. 2 is a detailed sectional view showing more clearly the construction of the window and of the control means therefor; and Figs. 3–7 are detailed diagrammatic views in horizontal cross-section illustrating the operation of the window shown in Fig. 1, Fig. 3 showing the transmission position of said window, Fig. 7 showing the extinction position and Figs. 4–6 showing intermediate positions.

Referring to Figs. 1 and 2, element 10 represents a conventional frame mounted to surround a window aperture in wall 12, which may, for example, be the inside wall of a railroad vehicle or the like, the outer wall and outer frame being indicated at 14 and 15 respectively. Within frames 10 and 15 is positioned a member 16 provided with projecting tongues 18 which cooperate with each other and with frames 10 and 15 to form three channels adapted to receive supplemental window frames 20, 22 and 24.

As shown in Fig. 2, the window element in frame 20 comprises a central layer 25 between a pair of layers 26 and 28 of glass or other transparent plastic. According to the practice of the invention, layer 25 comprises polarizing material of particular polarizing properties which will be described in more detail hereafter. Similarly, the window element in frame 22 comprises a polarizing layer 30 surrounded by glass or other plastic layers 32 and 34, and the window element in frame 24 comprises a polarizing layer 35 between glass layers 36 and 38. Polarizing layers 30 and 35 similarly possess special polarizing properties which will be described in more detail hereinafter.

In the illustrated embodiment of the invention, window frame 20 is fixedly mounted. Window frames 22 and 24, on the other hand, are mounted for sliding movement within the channels in element 16, and means are provided for controlling this movement and causing these two windows to slide in mutually opposite directions. As shown, such means may comprise tongues 40 and 42 on frames 22 and 24 respectively and threaded along their lower edges for engagement with worm or screw members 45 and 44 which may be mounted in any suitable way within walls 12 and 14. Screws 45 and 44 are provided at one end with a pair of meshing gears 46 and 48, which are in turn controlled by a worm or screw 52, engaging gear 48 and journaled in wall 12 and provided with a suitable control knob 50.

It will be seen, therefore, that rotation of knob 50 in either direction will cause screws 44 and 45 to rotate in opposite directions and so cause the slidably mounted windows to move linearly with respect to the fixed window and in mutually opposite directions. In accordance with the invention, this movement will result in a variation in the amount of light transmitted by the window as a whole, and the reason for this result will be apparent upon reference to Figs. 3–7.

It is of course to be understood that the above control means are given only as an illustrative example, and that the invention is in no way to be construed as limited to such a construction.

Referring to Fig. 3, element 25 represents the polarizing layer in the fixed window, and elements 30 and 35 represent the polarizing layers in the two movable windows. Layer 25 is represented as comprising a multiplicity of vertical parallel strips of polarizing material of uniform polarization characteristics. These strips are so arranged that adjacent strips have their transmission axes relatively perpendicular. For example, strips 60 may be considered as having their transmission axes vertical, i. e., perpendicular to the plane of the sheet of the drawing, as is indicated by the short arrows 62, and strips 65 may be considered as having their transmission axes horizontal, i. e., parallel to the plane of the sheet of the drawing, as is indicated by relatively long arrows 64.

Such a polarizer may be formed in a number of ways, as for example by laminating separate strips of sheet polarizing material onto a common backing and arranging adjacent strips with their transmission axes relatively perpendicular. Another suitable method is to orient at right angles to each other the surface molecules of adjacent strips of a sheet of a transparent linear high polymeric plastic, the molecules of which contain hydroxyl groups, and then to treat the sheet as by dyeing or staining with a neutral dichroic dye to render it light-polarizing. A preferred example of such plastic is polyvinyl alcohol, and others are polyvinyl acetal and regenerated cellulose. Suitable dyes or stains for use with these materials include mixed dichroic cotton dyes and solutions containing triiodide ions.

A satisfactory alternative method using a material such as polyvinyl alcohol is to orient the molecules on each surface of the sheet in directions substantially at right angles to each other. This may be done with a single sheet or the same result may be accomplished by stretching two sheets to orient the molecules therein and laminating them together with their stretch axes mutually perpendicular. Each surface of such an oriented sheet may then have alternate strips stained or dyed as from a matrix such as a washoff relief, the stained strips of each side being separated by unstained strips of equal width and being positioned to coincide with and overlie the unstained strips on the other surface. Such polarizers may easily be prepared in sheets of such thinness that their polarizing properties will be substantially the same as those indicated in the drawing for element 25, even though adjacent polarizing strips are on opposite surfaces of the sheet.

Polarizing layer 30 is similarly shown as comprising a multiplicity of parallel strips, strips 70 having their transmission axes vertical as indicated by arrows 72 and strips 75 having their transmission axes horizontal as indicated by arrows 74. The polarizing properties of these strips, however, are not uniform but preferably vary uniformly across the width of each strip from approximately zero at one edge to substantially complete polarization at the other edge. This is indicated in Figs. 3–7 by showing these strips as wedge-shaped and it will be noted that the arrangement of wedges is uniform, with the high polarizing edge of one strip adjacent the non-polarizing edge of its adjacent strip.

Polarizing layer 35 is similar to layer 30, comprising a succession of adjacent polarizing strips of varying density, strips 80 having their transmission axes vertical as indicated by arrow 82 and strips 85 having their transmission axes horizontal as indicated by arrows 84. It will be noted, however, that the arrangement of these strips with respect to their polarizing properties is opposite to that of the strips in polarizing layer 30. Thus if a strip 80 coincides with a strip 70, the high polarizing edge of the strip 80 will be opposite the non-polarizing edge of the strip 70, so that the combined polarizing properties of the two strips will be substantially uniform throughout their overlapping areas.

Elements having polarizing properties such as polarizers 30 and 35 may in general be formed in substantially the same ways as described above in connection with polarizer 25. For example, they may be made in the same manner as element 25 by laminating a series of wedge-shaped strips to a common backing. Alternatively, a sheet of a material such as polyvinyl alcohol oriented on both sides in crossed directions as described above, may be differentially stained by suitable means such as a graded wash-off relief. In other words the density of dichroic dye in each of the dyed strips will vary uniformly across the width of the strip. Such density of polarizing dye or polarizing material may easily be controlled within any desired limits from approximately zero or any other predetermined minimum adjacent one edge to substantially complete polarization or any other desired predetermined maximum adjacent the other edge. Other methods of producing elements having such polarizing properties will doubtless be apparent and are to be construed as within the scope of this invention and of the claims herein.

As is pointed out above, Fig. 3 shows the transmission position for the three elements comprising the variable density window of this invention. This results from the fact that the three window elements are so positioned with respect to each other than the transmission axes of each set of three overlying strips are relatively parallel. It follows that light transmitted by each of said strips will similarly be transmitted by the strips overlying it, and therefore this position constitutes the full transmission position for the window.

Fig. 4 shows the relative positions of the polarizers when each of the movable windows has moved a distance equal to one-quarter of the width of one of the polarizing strips therein, the respective directions of movement of the two windows being indicated by arrows 54 and 55. In this position it will be seen that each of strips 60 and 65 may be divided for purposes of discussion into three component areas, indicated by broken lines *a*, *b*, *c* and *d*. Light incident on area *b—c* of strip 65 will be polarized to vibrate horizontally, as indicated by arrow 64, and will encounter only similar areas in polarizers 30 and 35 whose transmission axes are parallel to its vibration direction. Accordingly, said light will be transmitted with substantially undiminished intensity in the same manner as in Fig. 3.

Light incident on area *a—b* will be similarly transmitted by polarizer 30 but will then encounter an area *a—b* in strip 80 of polarizer 35 whose transmission axis is perpendicular to its vibration direction. However, this area *a—b* of strip 80 is adjacent its non-polarizing edge, the density of polarizing material therein is relatively low, and very little of the light will be absorbed.

Similarly, light incident on strip *c—d* will be partially absorbed when it encounters the low polarizing area *a—b* of one of strips 70 in polarizer 30, but the light not absorbed by this strip will be further freely transmitted by strip 85 of polarizer 35. It will be apparent, therefore, that the combined polarizers in the position shown in Fig. 4 will absorb very little of the light transmitted by polarizer 25 and so will produce a partial diminution of the total amount of light transmitted by the window.

Fig. 5 shows the relative position of the polarizing elements when each movable window has moved a distance equal to half the width of the polarizing strips therein. It will be seen that during the movement from the position shown in Fig. 4 to that shown in Fig. 5, areas *a—b* and $c$—$d$ have become progressively wider and area $b$—$c$ progressively narrower until it disappears, leaving only the areas $a$—$b$ and $c$—$d$.

Light incident on area $a$—$b$ of polarizer 25 will be polarized to vibrate horizontally, will be transmitted with substantially undiminished intensity through the corresponding area in polarizer 30, but will then be partially absorbed by area $a$—$b$ in strip 80 of polarizer 35. Light incident on area $c$—$d$ will similarly be partially absorbed by the corresponding area in strip 70 of polarizer 30. It will be seen, further, that area $a$—$b$ in strip 80 of polarizer 35 is of the same width as area $c$—$d$ in strip 70 of polarizer 30. Accordingly, the absorption in each of areas $a$—$b$ and $c$—$d$ will be greater than was the case in connection with Fig. 4 and will result in a further partial diminution of the total amount transmitted by the window from that transmitted in the position shown in Fig. 4.

Fig. 6 shows the relative position of the polarizing elements when each movable window has moved a distance equal to three-quarters of the width of one of the polarizing strips therein. During the movement to this position from that shown in Fig. 5, areas $a$—$b$ and $c$—$d$ become progressively narrower and area $b$—$c$ progressively wider until they reach the same relative sizes as in Fig. 4.

In this position, areas $b$—$c$ of strips 70 and 80 will coincide and combine to produce approximately fifty percent polarization and will thus absorb approximately fifty percent of the light transmitted thereto from area $b$—$c$ of strip 65. At the same time area $a$—$b$ of strip 80 will absorb even more of the light transmitted to it from area $a$—$b$ of strip 75. The same result will take place in areas $c$—$d$ of strips 70 and 85. In this position, therefore, it will be seen that the total amount of light transmitted by the window as a whole is somewhat less than one-half that transmitted by the first or fixed polarizer.

Fig. 7 shows the relative position of the polarizing elements after each movable window has moved a distance equal to the width of one of the polarizing strips therein. In this position strips 70 and 80 combine to produce polarization equal to that of strip 65, and strips 75 and 85 combine to produce polarization equal to that of strip 60. Since the respective transmission axes of strip 65 and strips 70 and 80 and of strip 60 and strips 75 and 85 are perpendicular to each other, all the light transmitted by polarizer 25 will be absorbed in polarizers 30 and 35. Accordingly, this is the extinction position of the window.

It will be apparent from the foregoing that the operation is the same for each of the component strips of the polarizers. It follows therefore that the total movement for each of the two movable windows from the transmission position to the extinction position need be no more than equal to the width of one of the polarizing strips. This width may vary, depending upon the use to which the window is to be put, but it may be pointed out that the strips need not be any wider than, for example, one-sixteenth of an inch, thus making it possible to produce extremely compact and simple constructions. In this connection, it will be apparent that the drawing herein is considerably exaggerated for purpose of description and that in actual practice the different window elements will preferably be of substantially less thickness and will be mounted in considerably closer relation than that shown.

It will be apparent that the above-described construction may be varied to a considerable extent without departing from the scope of the invention. The mounting means and control means for the windows may be modified in a wide variety of ways. Also, the arrangement of the separate window elements may be changed, the only essential being that two be movable as described above with respect both to each other and to the third. It should also be pointed out that it may prove desirable to alter the respective directions of the transmission axes of the various polarizers herein. In other words, adjacent polarizing strips need not have their transmission axes respectively vertical and horizontal so long as they remain relatively perpendicular, and, in a preferred arrangement, said axes may be at angles of substantially 45 degrees to the horizontal.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A variable density window comprising, in combination, frame means providing a window aperture, three sheet-like, light-polarizing elements, means for mounting said elements in substantially parallel superimposed relation within said frame, each of said elements comprising a multiplicity of parallel strips of substantially uniform width comprising light-polarizing material, the transmission axes of adjacent strips being relatively perpendicular, said elements being positioned with the component strips thereof relatively parallel, the polarizing properties of the component strips of one of said elements being substantially uniform, the polarizing properties of each of the other two of said elements varying uniformly across the width thereof, said two elements being so positioned with respect to each other that the direction of variation of the polarizing properties in the component strips of one of said elements is opposite to said direction of variation in the other said element, two of said elements being mounted for parallel, linear movement within said frame, and means for moving said movably mounted elements.

2. A variable density window comprising, in combination, frame means providing a window aperture, three sheet-like, light-polarizing elements, means for mounting said elements in substantially parallel superimposed relation within said frame, each of said elements comprising a multiplicity of parallel strips of substantially uniform width comprising light-polarizing material, the transmission axes of adjacent strips being relatively perpendicular, said elements being positioned with the component strips thereof relatively parallel, the polarizing properties of the component strips of one of said elements being substantially uniform, the density of polarizing material in each of the component strips of the other two of said elements varying uniformly across the width thereof from a predetermined minimum to a predetermined maximum, said two elements being so positioned with respect to each other that the direction of said variation in the component strips of one of said elements is opposite to said direction of variation in the other said element, two of said elements being mounted for parallel, linear movement within said frame, and means for moving said movably mounted elements.

3. A variable density window comprising, in combination, frame means providing a window aperture, three sheet-like, light-polarizing elements, means for mounting said elements in substantially parallel superimposed relation within said frame, each of said elements comprising a multiplicity of parallel strips of substantially uniform width comprising light-polarizing material, the transmission axes of adjacent strips being relatively perpendicular, said elements being positioned with the component strips thereof relatively parallel, the density of polarizing material in the component strips of one of said elements being substantially uniform and sufficient to effect substantially complete polarization, the density of polarizing material in each of the component strips of the other two of said elements varying uniformly across the width thereof from approximately zero to substantial equality with the density of said first named strips, said two elements being so positioned with respect to each other that the direction of said variation in the component strips of one of said elements is opposite to said direction of variation in the other said element, two of said elements being mounted for parallel, linear movement within said frame, and means for moving said movably mounted elements.

4. A light-polarizing device in sheet form comprising a multiplicity of parallel strips of substantially uniform width comprising light-polarizing material, the transmission axes of adjacent strips being relatively perpendicular, the density of polarizing material in each of said strips varying uniformly across the width thereof from a predetermined minimum to a predetermined maximum, the intensity of light transmitted by each of said strips varying uniformly across the width thereof inversely to said variation in density of polarizing material.

5. A light-polarizing device in sheet form comprising a multiplicity of parallel strips of substantially uniform width comprising light-polarizing material, the transmission axes of adjacent strips being relatively perpendicular, the density of polarizing material in each of said strips varying uniformly across the width thereof from approximately zero to sufficient to effect substantially complete polarization, the intensity of light transmitted by each of said strips varying uniformly across the width thereof inversely to said variation in density of polarizing material.

6. A light-polarizing device comprising a sheet of polyvinyl alcohol, a surface of said sheet comprising a multiplicity of parallel strips of uniform width, each strip having the molecules therein oriented to substantial parallelism, the direction of molecular orientation of adjacent strips being relatively perpendicular, said oriented surface having a dichroic dye incorporated therein, the density of dye in each of the dyed strips varying uniformly across the width of each strip from a predetermined minimum adjacent one edge to a predetermined maximum adjacent the other edge, the intensity of light transmitted by each of said strips varying uniformly across the width thereof inversely to said variation in density of dye.

7. A light-polarizing device comprising a sheet of a transparent linear high polymeric plastic the molecules of which contain hydroxyl groups, the molecules of each surface of said sheet being oriented to substantial parallelism in directions substantially at right angles to each other, one of said surfaces having a neutral dichroic dye incorporated therein in a multiplicity of parallel strips of uniform width, said strips being spaced from each other by undyed strips approximately equal in width to the width of the dyed strips, the other surface having a neutral dichroic dye similarly incorporated therein in a series of parallel strips substantially equal in width to the dyed strips of the other said surface and positioned to coincide and overlie the undyed strips of said first named surface, the density of dye in each of the dyed strips varying uniformly across the width of each strip from a predetermined minimum adjacent one edge to a predetermined maximum adjacent the other edge.

WILLIAM H. RYAN.